US010487670B2

(12) United States Patent
Thomas et al.

(10) Patent No.: US 10,487,670 B2
(45) Date of Patent: Nov. 26, 2019

(54) GAS TURBINE ENGINE COMPONENT INCLUDING A COMPLIANT LAYER

(71) Applicants: Rolls-Royce North American Technologies, Inc., Indianapolis, IN (US); Rolls-Royce Corporation, Indianapolis, IN (US)

(72) Inventors: David J. Thomas, Brownsburg, IN (US); Richard C. Uskert, Timonium, MD (US); Adam L. Chamberlain, Moorseville, IN (US); Matthew Peter Basiletti, Lafayette, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 1074 days.

(21) Appl. No.: 14/138,762

(22) Filed: Dec. 23, 2013

(65) Prior Publication Data
US 2015/0050158 A1 Feb. 19, 2015

Related U.S. Application Data

(60) Provisional application No. 61/780,504, filed on Mar. 13, 2013.

(51) Int. Cl.
*F01D 5/28* (2006.01)
*B23K 1/00* (2006.01)
(Continued)

(52) U.S. Cl.
CPC .............. *F01D 5/28* (2013.01); *B23K 1/0008* (2013.01); *B23K 1/0018* (2013.01); *B32B 37/18* (2013.01);
(Continued)

(58) Field of Classification Search
CPC ........ F01D 5/3092; F01D 5/3084; F01D 5/30; F01D 5/3007; F01D 5/28; F01D 5/282;
(Continued)

(56) References Cited

U.S. PATENT DOCUMENTS 3,784,320 A 1/1974 Rossmann et al.
4,051,585 A * 10/1977 Walker .................. B23P 15/006
228/121

(Continued)

OTHER PUBLICATIONS

International Search Report and Written Opinion for International Application No. PCT/US2014/022392, dated Dec. 5, 2014, 13 pages.
(Continued)

Primary Examiner — Jason D Shanske
Assistant Examiner — Julian B Getachew
(74) Attorney, Agent, or Firm — Barnes & Thornburg LLP

(57) ABSTRACT

A blade for a gas turbine engine comprises a blade portion having a first end and a second end and an engagement portion including a first surface coupled to the second end of the blade portion and a second surface coupled to the second end of the blade portion, the first and second surfaces arranged to extend divergently away from one another. The engagement portion is adapted for coupling to a wheel included in a gas turbine engine wheel.

18 Claims, 2 Drawing Sheets

(51) Int. Cl.
  *B32B 37/18* (2006.01)
  *B32B 37/24* (2006.01)
  *F01D 5/30* (2006.01)

(52) U.S. Cl.
  CPC .......... *B32B 37/24* (2013.01); *F01D 5/3084* (2013.01); *F01D 5/3092* (2013.01); *B32B 2037/243* (2013.01); *B32B 2037/246* (2013.01); *B32B 2255/205* (2013.01); *B32B 2307/30* (2013.01); *B32B 2315/02* (2013.01); *B32B 2603/00* (2013.01); *F05D 2230/23* (2013.01); *F05D 2230/237* (2013.01); *F05D 2230/31* (2013.01); *F05D 2230/313* (2013.01); *F05D 2230/314* (2013.01); *F05D 2300/6033* (2013.01); *Y02T 50/672* (2013.01); *Y10T 156/10* (2015.01)

(58) Field of Classification Search
  CPC .... F01D 5/284; B23P 15/04; Y10T 29/49801; Y10T 29/49337; B32B 2037/243; B32B 2037/246; B32B 2255/205; B32B 2307/30; B32B 2315/02; B32B 2603/00; B32B 37/24; B32B 37/18; B23K 2001/12; B23K 1/0018
  See application file for complete search history.

(56) References Cited

U.S. PATENT DOCUMENTS

| | | |
|---|---|---|
| 4,417,854 A | 11/1983 | Cain et al. |
| 4,471,008 A | 9/1984 | Huther |
| 4,538,331 A | 9/1985 | Egan et al. |
| 4,790,723 A | 12/1988 | Wilson et al. |
| 4,820,126 A | 4/1989 | Gavilan |
| 5,137,420 A * | 8/1992 | Sigworth .............. F01D 5/3007 415/170.1 |
| 5,573,377 A | 11/1996 | Bond et al. |
| 6,378,755 B1 | 4/2002 | Grylls et al. |
| 7,300,255 B2 | 11/2007 | Potter et al. |
| 7,329,101 B2 | 2/2008 | Carper et al. |
| 2010/0189562 A1* | 7/2010 | Blanchard .......... B29D 99/0025 416/219 R |
| 2010/0284816 A1* | 11/2010 | Propheter-Hinckley .................... F01D 5/3007 416/241 B |

OTHER PUBLICATIONS

European Patent Office Official Action, Application No. 147716443.3-1610, dated Jan. 20, 2017, 4 pages.
European Office Action issued in connection with European Application No. 14771644.3-1610, dated Oct. 24, 2017, 4 pages.

* cited by examiner

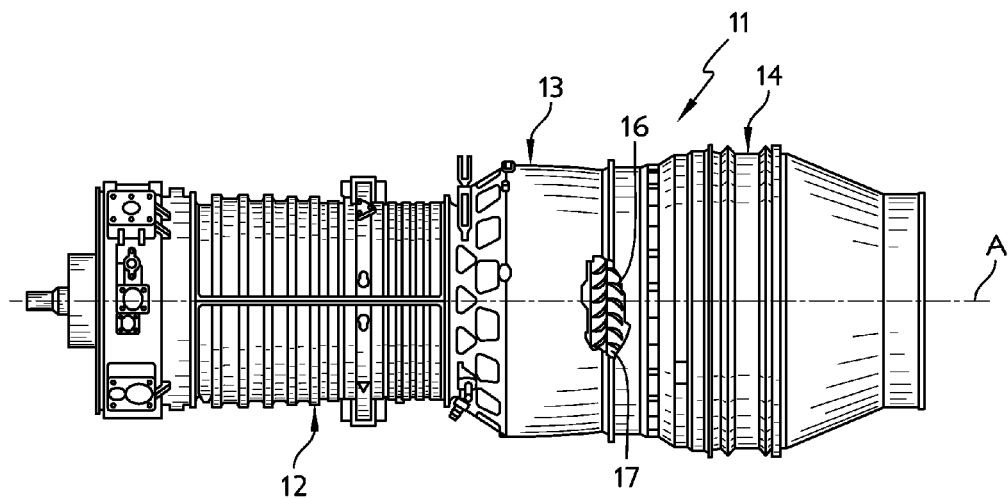
FIG. 1
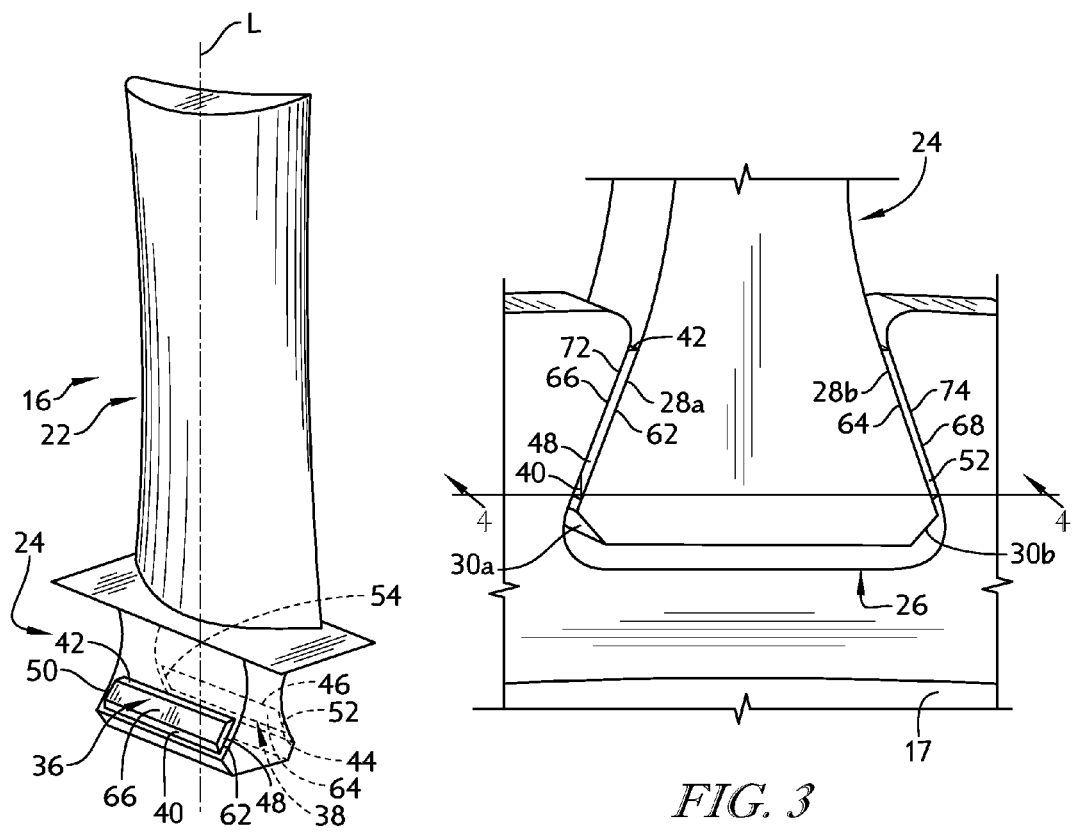
FIG. 2
FIG. 3

GAS TURBINE ENGINE COMPONENT INCLUDING A COMPLIANT LAYER

CROSS REFERENCE TO RELATED APPLICATIONS

This application claims priority under 35 U.S.C. § 119(e) to U.S. Provisional Application Ser. No. 61/780,504, filed Mar. 13, 2013, which is expressly incorporated by reference herein.

GOVERNMENT RIGHTS

The present application was made with United States government support under Contract No. FA8650-07-C-2803, awarded by the Department of Defense. The United States government may have certain rights in the present application.

FIELD OF THE DISCLOSURE

The present disclosure relates to a gas turbine engine component, and more particularly, to a gas turbine engine component including a compliant layer.

BACKGROUND

In order to improve efficiency and reduce emissions, there has been and remains a need to elevate temperatures at one or more locations in a gas turbine engine. In order to meet this need, improvements in the materials forming various components of the gas turbine engine have been necessary so the components may withstand the elevated temperatures. These improvements have resulted in the use of components in the gas turbine engine which are formed of different materials. By way of non-limiting example, the engagement and/or interfacing of components formed of different materials may have various shortcomings, drawbacks, and disadvantages. Accordingly, there remains a need for further contributions in this area of technology.

SUMMARY

According to the present disclosure, a gas turbine engine includes blades and wheels or rotors. The blades are adapted to mate with the wheels or rotors to secure the blades during operation of the gas turbine engine.

In illustrative embodiments, a gas turbine engine component includes a compliant layer. In one form, the component is constructed of a ceramic matrix composite (CMC) material and the compliant layer is bonded or otherwise attached to a surface of the CMC material. In one aspect, the compliant layer is formed of a metallic, ceramic-free material. Another aspect includes processing the compliant layer to provide the component with a desired configuration for engaging with a metallic gas turbine engine component. In still another aspect, the CMC component is engaged with a metallic component such that the compliant layer of the CMC component is in contact with the metallic component.

In illustrative embodiments, a method includes providing a first gas turbine engine component constructed from a ceramic matrix composite (CMC) material. The first component includes an engagement portion and a compliant layer bonded to the CMC material. The method also includes processing at least a portion of the compliant layer to provide the engagement portion with a desired configuration for engaging with a second gas turbine engine component.

In illustrative embodiments, a gas turbine engine component includes a body constructed from a ceramic matrix composite (CMC) material. The body also includes an engagement portion. The component further includes a ceramic-free compliant layer bonded to a surface of the CMC material in the engagement portion.

In illustrative embodiments, a method includes providing a gas turbine engine component that includes a body constructed from a ceramic matrix composite (CMC) material and including an engagement portion, and a ceramic-free compliant layer bonded to a surface of the CMC material in the engagement portion. The method also includes engaging the component with a second, metallic gas turbine engine component with the compliant layer positioned in contact with the second component.

In illustrative embodiments, a system includes a first gas turbine engine component constructed from a ceramic matrix composite (CMC) material and including a ceramic-free compliant layer bonded to a surface of the CMC material, and a second gas turbine engine component formed from a metallic material. In addition, the first component is engaged with the second component with at least a portion of the compliant layer in contact with the second component.

According to an aspect of the present disclosure, a method of producing a gas turbine engine component may include forming a blade from a ceramic matrix composite material, the blade including a blade portion and an engagement portion, bonding at least one compliant layer to the engagement portion, and processing the at least one compliant layer to provide a mating surface for engagement with a wheel.

In some embodiments, the blade portion may include a first end and a second end. The engagement portion may include a first surface and a second surface coupled to the second end of the blade portion on opposing sides thereof and arranged to extend divergently away from one another. Bonding the at least one compliant layer to the engagement portion may include positioning the first surface of the engagement portion in a processing orientation and applying a metallic material to the first surface to form a first compliant layer.

In some embodiments, bonding the at least one compliant layer may further include positioning the second surface of the engagement portion in a processing orientation and applying a metallic material to the second surface to form a second compliant layer.

In some embodiments, the metallic material of the first and second compliant layers may be formed into a strip and applied using one of brazing, electroless deposition, spray coating, chemical vapor deposition, or plasma spraying.

In some embodiments, the metallic material of the first and second compliant layers may be directly applied to the engagement portion using one of brazing, electroless deposition, spray coating, chemical vapor deposition, or plasma spraying.

In some embodiments, forming the blade may include collating three or more plies of ceramic matrix composite fibers and bonding the three or more plies together. Bonding the compliant layer to the engagement portion may include applying a metallic material to a first portion of a first ply of the three or more plies to form a first compliant layer and applying a metallic material to a second portion of the first ply to form a second compliant layer. Forming the blade may further include collating a second ply of the three or more plies over at least the first portion of the first ply and collating a third ply of the three or more plies over at least the second portion of the first ply prior to bonding the three or more plies together.

In some embodiments, processing the at least one compliant layer may include processing the engagement portion to expose at least a portion of the first compliant layer, processing the engagement portion to expose at least a portion of the second compliant layer, and processing the exposed portions of the first and second compliant layers to provide mating surfaces for engagement with the wheel.

In some embodiments, the second ply may include an aperture formed therethrough sized and positioned to surround at least a portion of the first compliant layer and the third ply may include an aperture formed therethrough sized and positioned to surround at least a portion of the second compliant layer.

In some embodiments, the at least one compliant layer may include a first edge extending along a surface of the engagement portion and a second edge spaced apart from the first edge and extending along the surface of the engagement portion substantially parallel to the first edge. Processing the compliant layer may include chamfering the first and second edges.

In some embodiments, processing the compliant layer may further include processing an outward facing surface of the compliant layer to approximate the contour of a mating surface of the wheel.

In some embodiments, the blade may be a turbine blade.

In some embodiments, the wheel is a turbine wheel.

In some embodiments, the at least one compliant layer may include at least one metal selected from the group consisting of iron, copper, titanium, aluminum, cobalt, nickel, tantalum, chromium, tungsten, rhenium, niobium, hafnium, platinum, ruthenium, and vanadium.

According to another aspect of the invention, a gas turbine engine blade may include a blade portion having, an engagement portion, and a plurality of compliant layers arranged to engage a turbine wheel of a gas turbine engine. The blade portion may include a first end and a second end. The engagement portion may include a first surface coupled to the second end of the blade portion and a second surface coupled to the second end of the blade portion, the first and second surfaces arranged to extend divergently away from one another. The plurality of compliant layers may be arranged to space the first and second surfaces from mating surfaces of the turbine wheel to dissipate localized stresses on the engagement portion by absorbing and distributing the forces along the length of the engagement portion to prevent fracturing of the engagement portion In some embodiments, the blade portion and engagement portion may be formed from a ceramic matrix composite material in a single unitary construction.

In some embodiments, the plurality of compliant layers may include a first compliant layer bonded to the first surface of the engagement portion and positioned to lie between the engagement portion and a mating surface of the turbine wheel and a second compliant layer bonded to the second surface of the engagement portion and positioned to lie between the engagement portion and a mating surface of the turbine wheel.

In some embodiments, the first and second compliant layers may be formed from a metallic, ceramic-free material.

In some embodiments, the first compliant layer may include a first edge extending along the first surface of the engagement portion and a second edge spaced apart from the first edge and extending along the first surface of the engagement portion substantially parallel to the first edge. The second compliant layer may include a third edge extending along the second surface of the engagement portion and a fourth edge spaced apart from the third edge and extending along the second surface of the engagement portion substantially parallel to the third edge. The first, second, third, and fourth edges may be chamfered.

In some embodiments, the first compliant layer may be formed by directly applying the metallic, ceramic-free material to the first surface of the engagement portion and the second compliant layer may be formed by directly applying the metallic, ceramic-free material to the second surface of the engagement portion.

In some embodiments, the first compliant layer may include a first strip of the metallic, ceramic-free material and a first bonding material positioned between and coupling the first strip of the metallic, ceramic-free material and the first surface of the engagement portion. The second compliant layer may include a second strip of the metallic, ceramic-free material and a second bonding material positioned between and coupling the second strip of the metallic, ceramic-free material and the second surface of the engagement portion.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

FIG. 1 is a partially cut-away side elevational view of a gas turbine engine in accordance with the present disclosure showing turbine blades arranged on turbine wheels designed to rotate about a central axis of the gas turbine engine in areas where temperature and pressure are elevated to levels which may alter the material properties of the turbine blades and/or turbine wheels and interfere with the gas turbine engines proper functioning due to failure of turbine blades and/or turbine wheels;

FIG. 2 is perspective view of a turbine blade in accordance with the present disclosure showing the turbine blade includes a blade portion, an engagement portion including surfaces extending divergently from one another, and a compliant layer bonded to each of the divergent surfaces of the engagement portion including a bonding surface coupled to the engagement portion and a mating surface positioned to cooperate with a groove or slot of the turbine wheel;

FIG. 3 is a perspective partially cut-away view of the turbine blade of FIG. 2 engaged with a turbine wheel showing the engagement portion of the turbine blade positioned within a slot or groove of the turbine wheel with the compliant layers arranged between the divergent surfaces of the engagement portion and convergent surfaces of the slot or groove to provide solid engagement between the turbine blade and turbine wheel and a buffer against stresses placed on the turbine blade during operation of the gas turbine engine.

DETAILED DESCRIPTION OF THE DRAWINGS

Figure 4:
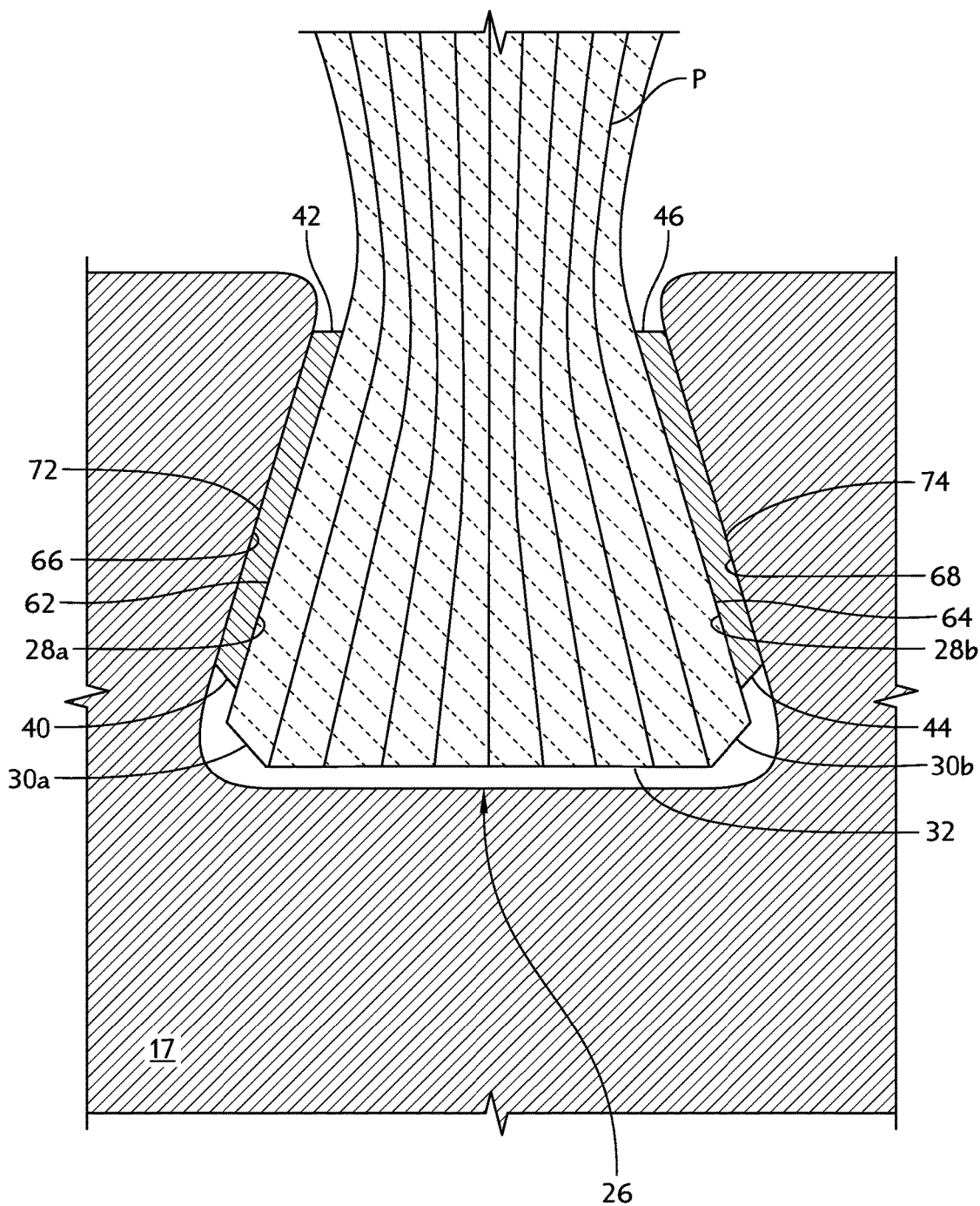
FIG. 4 is a sectional view taken along line 4-4 of FIG. 3.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A gas turbine engine component including a compliant layer is disclosed herein. In one form, the component is constructed of a ceramic matrix composite (CMC) material and the compliant layer is bonded or otherwise attached to a surface of the CMC material. In one aspect, the compliant layer is formed of a metallic, ceramic-free material. Another aspect includes processing the compliant layer to provide the component with a desired configuration for engaging with a metallic gas turbine engine component. In still another aspect, the CMC component is engaged with a metallic component such that the compliant layer of the CMC component is in contact with the metallic component.

Referring to FIG. 1, there is shown an exemplary gas turbine engine 11. It should be understood that gas turbine engine 11 may find application in all types of aircraft, including for example, helicopters, fixed wing planes, tactical fighters, trainers, missiles and other related apparatus. Further, gas turbine engine 11 may be equally suited to be used for a wide variety of industrial applications. Historically, there has also been a widespread use of industrial gas turbine engines in applications such as pumping sets for gas and oil transmission lines, electricity generation, and naval propulsion amongst others. In one embodiment, gas turbine engine 11 includes a compressor section 12, a combustor section 13, and a turbine section 14. This is only an example of a gas turbine engine and it will be understood that there are a variety of ways that the components may be linked together or arranged. Gas turbine engine 11 also includes turbine wheels 17 and a plurality of turbine blades 16 engaged with turbine wheels 17. Turbine wheel 17 is coupled to a shaft (not shown) within gas turbine engine 11 which rotates about a central axis A.

In one example, turbine wheel 17 may formed of any suitable material. For example, turbine wheel 17 may be formed of a metallic material such as steel, aluminum, titanium, nickel, or an alloy or a superalloy, although other metallic and non-metallic materials are possible. Wheels like turbine wheels 17 and blades like turbine blades 16 may be positioned within the various sections of the gas turbine engine 11, such as the compressor section 12, combustor section 13, or turbine section 14.

As illustrated in FIG. 2, for example, turbine blade 16 includes a blade portion 22 that generally extends along longitudinal axis L and an engagement portion 24 coupled to an end of blade portion 22. In one embodiment, turbine blade 16 has a monolithic structure and is formed of a ceramic material such as silicon carbide, silicon/silicon carbide, and hybrids thereof, just to provide a few non-limiting possibilities. In another embodiment, turbine blade 16 is constructed from a composite construction that includes a matrix and one or more plies P that include a plurality of fibers as shown, for example, in FIG. 4.

For example, turbine blade 16 may be constructed from a CMC material, but other types of composites are also contemplated. The matrix that composes the CMC material can be applied in a variety of ways, including a single step, two steps, or multiple steps. In addition, the matrix can be deposited via chemical vapor deposition among other possible techniques. Some exemplary ceramic materials that could be used for the matrix material include silicon carbide, silicon/silicon carbide, and hybrids thereof, just to provide a few non-limiting possibilities. The fibers that make up the plies P of the composite construction can be of various denier and the plies P can have various thread count. In addition, the fibers can be unidirectional or cross plied, as well as any other orientation. In general the plies P can be any architecture, including 2D or 3D, tape, woven, etc. In some forms, such as some 2D architectures, adjacent plies P can be stitched together to maintain a shape during processing. Forms in which turbine blade 16 is constructed from two or more materials in discrete locations are also possible.

As illustrated in FIGS. 3-4, for example, engagement portion 24 is generally configured to be received in a slot or groove 26 of turbine wheel 17 to provide a dovetail, interlocking arrangement between turbine blade 16 and turbine wheel 17. More particularly, engagement portion 24 includes oppositely positioned surfaces 28a, 28b which extend divergently away from longitudinal axis L to oppositely positioned surfaces 30a, 30b, respectively, which extend convergently toward longitudinal axis L as shown, for example, in FIG. 4. A lower surface 32 extends between and connects surfaces 30a, 30b.

In one embodiment, turbine blade 16 also includes compliant layers 36, 38 bonded or otherwise attached to surfaces 28a, 28b, respectively, of the engagement portion 24 as shown, for example, in FIGS. 2-4. Compliant layers 36, 38 may be directly applied, bonded, or otherwise attached to surfaces 28a, 28b. In alternative embodiments, a compliant layer may be directly applied, bonded, or otherwise attached to other portions of turbine blade 16 in addition to or in lieu of engagement portion 24. It should be understood that compliant layers 36, 38 are discontinuous or not connected with one another. In addition, portions 36, 38 do not extend on other surfaces of engagement portion 24 besides surfaces 28a, 28b as shown, for example, in FIG. 2. However, it should be understood that a compliant layer may be formed of a continuous, single portion which extends around all or part of engagement portion 24. For example, a compliant layer may be positioned on surfaces 28a, 28b, 30a, 30b, and 32 and on the opposite faces extending between these surfaces. The elongated aspect of compliant layers 36, 38 generally extend transversely to longitudinal axis L, although other variations are possible.

In one embodiment, compliant layer 36 includes a lower, chamfered edge 40 that is spaced above the intersection of surfaces 28a and 30a, and an upper, chamfered edge 42 positioned opposite of lower edge 40 as shown, for example, in FIGS. 2-4. Similarly, compliant layer 38 includes a lower, chamfered edge 44 that is spaced above the intersection of surfaces 28b, 30b, and an upper, chamfered edge 46 positioned opposite of lower edge 44 as shown, for example, in FIGS. 3-4. Amongst other things, chamfered edges 40-46 may facilitate ease of removing and positioning engagement portion 24 in and out of groove 26 of turbine wheel 17. While not illustrated, it should also be understood that edges 48, 50 of compliant layer 36 and edges 52, of compliant layer 38 may also have a chamfered configuration in order to facilitate ease of removing and positioning engagement portion 24 in and out of groove 26 of turbine wheel 17. However, in alternative embodiments, the edges of compliant layers 36, 38 are not chamfered or otherwise beveled.

Compliant layers 36, 38 may be positioned on and bonded or otherwise attached to turbine blade 16 using any suitable approach. By way of non-limiting example, compliant layers 36, 38 may be directly applied, bonded, or otherwise attached to turbine blade 16 through brazing, electroless deposition, spray coating, chemical vapor deposition, or plasma spraying, just to provide a few non-limiting examples. One or more adhesives and/or mechanical connections, amongst other possibilities, used to attach (in whole or in part) compliant layers 36, 38 to turbine blade 16 are also possible. In one embodiment, turbine blade 16 is formed of a CMC material, for example, and compliant layers 36, 38 are provided on turbine blade 16 after all CMC processing is completed. For example, formation of turbine blade 16 may involve collating together multiple plies P of a composite construction to a certain thickness and then forming a desired shape. The plies P can be collated on tooling, such as a mold or a mandrel, among others, to define the shape, or near shape, of the component. During fabrication the composite construction can be rigidized while coupled with the tooling and prior to the introduction of the matrix. Rigidization can occur when fibers are bonded with a bonding material at points of contact. In some forms the bonding material can thoroughly coat the fibers. After rigidization the intermediate form can be further processed by removing the mandrel, mold or other tooling. In one non-limiting example, the mandrel can be removed by physical, chemical, or thermal processes, among others. The matrix is then provided to infiltrate between the plies P and fibers to form the composite construction. Further processing or machining of the resulting CMC structure may then be performed, after which compliant layers 36, 38 may be provided.

However, it should be understood that compliant layers 36, 38 may be provided before one or more steps in the process for forming turbine blade 16 have been completed. For example, in one embodiment, compliant layers 36, 38 may be formed during formation of the CMC material, such as between plies P of the construction. Once formation of the CMC material is completed, the engagement portion 24 may be processed to expose the underlying compliant layers 36, 38 allowing for engagement between the compliant layers 36, 38 and the turbine wheel 17. In an alternative embodiment, one or more of the plies P may contain apertures formed therethrough sized to surround at least a portion of the compliant layers 36, 38 minimizing or eliminating the processing of the engagement portion to expose the compliant layers 36, 38 for engagement with the turbine wheel 17.

In one embodiment, the material of compliant layers 36, 38 is chosen to have greater ductility or malleability than the material from which turbine blade 16 is formed or constructed. For example, in forms where turbine blade 16 is formed of a monolithic ceramic material or constructed from a CMC material, compliant layers 36, 38 may be formed of a metallic material. In these or other forms where turbine blade 16 is formed of a monolithic ceramic material or constructed from a CMC material, compliant layers 36, 38 are free from ceramic materials. In another embodiment, compliant layers 36, 38 are free from or does not include any of the elements defining the ceramic of the monolithic ceramic structure or the ceramic matrix of the CMC material. For example, in forms in which silicon is used in the ceramic matrix of the CMC material, compliant layers 36, 38 are free from silicon. Compliant layers 36, 38 is formed of steel, an alloy, or a superalloy, as non-limiting examples. Compliant layers 36, 38 may additionally or alternatively include iron, copper, titanium, aluminum, cobalt, nickel, tantalum, chromium, tungsten, rhenium, niobium, hafnium, platinum, ruthenium, and vanadium. Forms in which the metal is selected from one or more subsets of this listing are also possible.

It should be understood that various processing or machining operations may be performed on compliant layers 36, 38. In one embodiment, for example, compliant layers 36, 38 may be processed or machined in order to provide engagement portion 24 with a desired configuration for engaging with turbine wheel 17. As best seen in FIG. 4, for example, in the absence of compliant layers 36, 38, a space or gap would exist between engagement portion 24 and the convergent surfaces 72, 74 of groove 26. Stated alternatively, in the absence of compliant layers 36, 38, engagement portion 24 would loosely fit in groove 26, whereas the presence of compliant layers 36, 38 provide a tighter fit, such as a press fit for example, between engagement portion 24 and groove 26. In one embodiment, compliant layers 36, 38 may be initially provided with a thickness intended to be greater than the final thickness thereof that provides a desired fit between engagement portion 24 and groove 26 in order to facilitate machining, such as removal of some of compliant layers 36, 38, to provide engagement portion 24 with a configuration necessary to provide the desired fit between engagement portion 24 and groove 26. While not previously mentioned, it should be understood that forms in which compliant layers 36, 38 is provided on turbine blade 16 such that engagement portion 24 includes a desired size and configuration for engaging with turbine wheel 17 without further processing and/or machining of compliant layers 36, 38 are also possible. In addition, while not illustrated, it should be understood that turbine blade 16 and/or turbine wheel 17 may include one or more locking mechanisms for maintaining engagement of turbine blade 16 with turbine wheel 17.

As illustrated in FIGS. 3 and 4, for example, compliant layers 36, 38 are positioned in contact with turbine wheel 17 and in between turbine blade 16 and turbine wheel 17 when these components are engaged with one another. For example, compliant layers 36, 38 may include bonding surfaces 62, 64 coupled to surfaces 28a, 28b, respectively, of engagement portion 24 and mating surfaces 66, 68 positioned opposite of the bonding surfaces 62, 64 and between chamfered edges 40-46 and edges 48-54 as shown, for example, in FIGS. 2-4. The mating surfaces 66, 68 may be configured to engage with the converging surfaces 72, 74 of groove 26. Amongst other things, this arrangement improves load transfer by distributing it over each of the compliant layers 36, 38 and also limits application of high stresses to turbine blade 16 that may occur through engagement of turbine blade 16 and turbine wheel 17 which may fracture turbine blade 16. Similarly, when turbine blade 16 is constructed from a CMC material for example, limiting high stresses may eliminate damage to the more brittle CMC material. Compliant layers 36, 38 may also help reduce wear of turbine blade 16 and/or turbine wheel 17 along the surfaces where these components would directly interface in the absence of compliant layers 36, 38.

The blade portion 22 includes a first end and a second end. The engagement portion 24 includes a first surface 62 (the bonding surface 62), a second surface 64 (the bonding surface 64), a third surface 30a (the surface 30a), a fourth surface 30b (the surface 30b), and the lower surface 32 as shown in FIG. 4. The first surface 62 and the second surface 64 of the engagement portion 24 are coupled to the second end of the blade portion 22 on opposing sides thereof. The first surface 62 and the second surface 64 of the engagement portion 24 extend divergently away from one another as shown in FIGS. 3 and 4. The third surface 30a extends away from the first surface 62 and contacts directly the first surface 62 and the lower surface 32. The fourth surface 30b of the engagement portion 24 extends away from the second surface 64 and contacts directly the second surface 64 and the lower surface 32 of the engagement portion 24. The third surface 30a and the fourth surface 30b of the engagement portion 24 extend convergently toward one another. The lower surface 32 of the engagement portion 24 extends between and contacts directly the third surface 30a and the fourth surface 30b of the engagement portion 24. The third surface 30a, the fourth surface 30b, and the lower surface 32 of the engagement portion 24 are planar as shown in FIGS. 3 and 4.

It should be appreciated that compliant layers as described herein may also be utilized in connection with one or more other components of gas turbine engine 11 in addition to or in lieu of turbine blade 16. Non-limiting examples of these other components include other blades, vanes, bladetracks, airfoils and liners. In addition, it should also be understood that compliant layers may be utilized in connection with components located in areas of gas turbine engine 11 other than turbine 14. In one form, compliant layers are utilized where components formed or constructed of different materials engage with one another. For example, a compliant layer may be provided on a CMC component that engages with a metallic component, although other variations are possible.

While the invention has been illustrated and described in detail in the drawings and foregoing description, the same is to be considered as illustrative and not restrictive in character, it being understood that only certain embodiments have been shown and described and that all changes and modifications that come within the spirit of the inventions are desired to be protected.

What is claimed is:

1. A method of producing a gas turbine engine component comprising
    providing a metallic wheel formed to define a dovetail-shaped groove, the metallic wheel arranged around an axis,
    forming a blade from a ceramic matrix composite material, the blade including a blade portion and an engagement portion, the engagement portion sized to be received in the dovetail-shaped groove,
    bonding at least one compliant layer to the engagement portion to cause a width of the engagement portion and the at least one compliant layer to be greater than a width of the dovetail-shaped groove, wherein the at least one compliant layer is applied using one of brazing, electroless deposition, spray coating, chemical vapor deposition, or plasma spraying, and
    machining the at least one compliant layer to provide a mating surface of the at least one compliant layer for engagement with the metallic wheel, wherein the machining step removes at least a portion of the at least one compliant layer to cause the width of the engagement portion and the at least one compliant layer to be less than the width of the dovetail-shaped groove,
    wherein the at least one compliant layer includes a first edge extending along a surface of the engagement portion and a second edge spaced apart axially relative to the axis from the first edge and extending along the surface of the engagement portion parallel to the first edge, and machining the at least one compliant layer includes chamfering the first and second edges to provide a first chamfer surface and a second chamfer surface,
    wherein the at least one compliant layer further includes a bonding surface bonded with the engagement portion of the blade, the first chamfer surface is planar and extends between and contacts directly the bonding surface and the mating surface, and the second chamfer surface is planar and extends between and contacts directly the bonding surface and the mating surface,
    wherein the at least one compliant layer is solid, the engagement portion of the blade is dovetail shaped, and the at least one compliant layer further includes a radial outer chamfer surface and a radial inner chamfer surface that is spaced apart radially from the radial outer chamfer surface relative to the axis, the radial outer chamfer surface is planar and extends between and contacts directly the bonding surface and the mating surface, the radial inner chamfer surface is planar and extends between and contacts directly the bonding surface and the mating surface.

2. The method of claim 1, wherein the blade portion includes a first end and a second end, the engagement portion includes a first surface and a second surface coupled to the second end of the blade portion on opposing sides thereof and arranged to extend divergently away from one another, and bonding the at least one compliant layer to the engagement portion includes positioning the first surface of the engagement portion in a first orientation and applying a metallic material to the first surface to form a first compliant layer.

3. The method of claim 2, wherein bonding the at least one compliant layer further includes positioning the second surface of the engagement portion in a second orientation and applying a metallic material to the second surface to form a second compliant layer.

4. The method of claim 3, wherein the metallic material of the first and second compliant layers is formed into a strip and applied using one of brazing, electroless deposition, spray coating, chemical vapor deposition, or plasma spraying.

5. The method of claim 3, wherein the metallic material of the first and second compliant layers is directly applied to the engagement portion using one of brazing, electroless deposition, spray coating, chemical vapor deposition, or plasma spraying.

6. The method of claim 1, wherein machining the compliant layer further includes machining an outward facing surface of the compliant layer to approximate the contour of a mating surface of the wheel.

7. The method of claim 1, wherein the at least one compliant layer includes at least one metal selected from the group consisting of iron, copper, titanium, aluminum, cobalt, nickel, tantalum, chromium, tungsten, rhenium, niobium, hafnium, platinum, ruthenium, and vanadium.

8. The method of claim 1, wherein the first chamfer surface extends between and contacts directly the radial outer chamfer surface and the radial inner chamfer surface and the second chamfer surface extends between and contacts directly the radial outer chamfer surface and the radial inner chamfer surface.

9. The method of claim 8, wherein the at least one compliant layer is located entirely in the dovetail-shaped groove.

10. The method of claim 9, wherein the blade portion includes a first end and a second end, the engagement portion includes a first surface, a second surface, a third surface, a fourth surface, and a lower surface, the first surface and the second surface of the engagement portion are coupled to the second end of the blade portion on opposing sides thereof, the first surface and the second surface of the engagement portion extend divergently away from one another, the third surface extends away from the first surface and contacts directly the first surface and the lower surface, the fourth surface extends away from the second surface and contacts directly the second surface and the lower surface, the third surface and the fourth surface extend convergently toward one another, and the lower surface extends between and contacts directly the third surface and the fourth surface.

11. The method of claim 10, wherein the third surface, the fourth surface, and the lower surface are planar.

12. The method of claim 10, wherein the first chamfer surface and the second chamfer surface are trapezoidal and the radial outer chamfer surface and the radial inner chamfer surface are rectangular.

13. A method of producing a gas turbine engine component, the method comprising
provuding a metallic wheel formed to define a groove and a metallic strip,
forming a blade from a ceramic matrix composite material, the blade including a blade portion and an engagement portion, the engagement portion sized to be received in the groove,
brazing a bonding surface of the metallic strip to the engagement portion to cause a width of the engagement portion and the metallic strip to be greater than a width of the groove, and
machining the metallic strip to provide a continuous mating surface for engagement with the metallic wheel, wherein the machining step removes a portion of the metallic strip to cause the width of the engagement portion and metallic strip to be less than the width of the groove,
wherein the metallic strip includes a first edge extending along a surface of the engagement portion and a second edge spaced apart from the first edge and extending along the surface of the engagement portion parallel to the first edge, and machining the metallic strip includes chamfering the first and second edges to provide a first chamfer surface and a second chamfer surface,
wherein the metallic wheel is arranged around an axis, the first chamfer surface is spaced apart axially from the second chamfer surface relative to the axis, the first chamfer surface is planar and extends between and contacts directly the bonding surface and the mating surface, and the aft edge second chamfer surface is planar and extends between and contacts directly the bonding surface and the mating surface, and
wherein the metallic strip further includes a radial outer chamfer surface and a radial inner chamfer surface that is spaced apart radially from the radial outer chamfer surface relative to the axis and each of the radial outer chamfer surface and the radial inner chamfer surface extend axially relative to the axis, the radial outer chamfer surface is planar and extends between and contacts directly the bonding surface and the mating surface, the radial inner chamfer surface is planar and extends between and contacts directly the bonding surface and the mating surface.

14. The method of claim 13, wherein the first chamfer surface extends between and contacts directly the radial outer chamfer surface and the radial inner chamfer surface and the second chamfer surface extends between and contacts directly the radial outer chamfer surface and the radial inner chamfer surface.

15. The method of claim 14, wherein the groove is dovetail shaped, the engagement portion is dovetail shaped, and the metallic strip is located entirely in the dovetail-shaped groove.

16. The method of claim 15, wherein the blade portion includes a first end and a second end, the engagement portion includes a first surface, a second surface, a third surface, a fourth surface, and a lower surface, the first surface and the second surface of the engagement portion are coupled to the second end of the blade portion on opposing sides thereof, the first surface and the second surface of the engagement portion extend divergently away from one another, the third surface extends away from the first surface and contacts directly the first surface and the lower surface, the fourth surface extends away from the second surface and contacts directly the second surface and the lower surface, the third surface and the fourth surface extend convergently toward one another, and the lower surface extends between and contacts directly the third surface and the fourth surface.

17. The method of claim 16, wherein the third surface, the fourth surface, and the lower surface are planar.

18. The method of claim 14, wherein the first chamfer surface and the second chamfer surface are trapezoidal and the radial outer chamfer surface and the radial inner chamfer surface are rectangular.

* * * * *